United States Patent [19]
Yuan

[11] Patent Number: 5,970,387
[45] Date of Patent: Oct. 19, 1999

[54] VOICE AND DIGIT COMPATIBLE FULLY AUTOMATIC RADIO PAGING SYSTEM

[76] Inventor: Jinyan Yuan, 60 Liaohe Street, Huanggu District, Shenyang 110032, China

[21] Appl. No.: 08/648,171

[22] PCT Filed: Nov. 18, 1994

[86] PCT No.: PCT/CN94/00092

§ 371 Date: Jul. 12, 1996

§ 102(e) Date: Jul. 12, 1996

[87] PCT Pub. No.: WO95/14355

PCT Pub. Date: May 26, 1995

[30] Foreign Application Priority Data

Nov. 18, 1993 [CN] China .................................. 93 2 29711
Dec. 18, 1993 [CN] China .................................. 93 1 15978

[51] Int. Cl.[6] ..................................................... G06F 15/21
[52] U.S. Cl. ........................................ 455/31.2; 455/31.3
[58] Field of Search ................................. 455/31.2, 31.3

[56] References Cited

U.S. PATENT DOCUMENTS

| | | | |
|---|---|---|---|
| 4,769,642 | 9/1988 | Davis et al. | 340/825 |
| 4,885,577 | 12/1989 | Nelson | 340/825 |
| 4,965,569 | 10/1990 | Bennett et al. | 379/56 |
| 5,006,983 | 4/1991 | Wayne et al. | 364/401 |
| 5,384,825 | 1/1995 | Dillard et al. | 379/59 |
| 5,412,719 | 5/1995 | Hamamoto et al. | 455/31.2 |
| 5,455,579 | 10/1995 | Bennett et al. | 341/110 |
| 5,457,732 | 10/1995 | Goldberg | 455/31.2 |
| 5,603,090 | 2/1997 | Nguyen et al. | 455/54.1 |

FOREIGN PATENT DOCUMENTS

| | | | |
|---|---|---|---|
| 0189089 | 7/1986 | European Pat. Off. | H04Q 7/02 |
| 0341609 | 11/1989 | European Pat. Off. | H04Q 7/02 |
| 0491108 | 6/1992 | European Pat. Off. | H04B 5/04 |
| 0552051 | 7/1993 | European Pat. Off. | H04M 3/50 |
| 9103900 | 3/1991 | WIPO | H04M 3/50 |
| 9205640 | 4/1992 | WIPO | H04B 7/00 |

*Primary Examiner*—David R. Hudspeth
*Assistant Examiner*—Daniel Abebe
*Attorney, Agent, or Firm*—Ladas & Parry

[57] ABSTRACT

There is provided a voice and digit compatible fully automatic radio paging system comprising a radio page central station and a plurality of pagers with voice and digit compatibility. The central station automatically captures a digit and voice information from a telephone network, automatically generates a radio page information based on a predetermined coding protocol, sets up a page information database. The page information is coded by a coder and is then sent by a transmitter in combination of voice and digit. The pager receives and stores the voice and digit information. The information can be repeatedly displayed. The system allows a digital pager to operate together with a pager having voice and digit compatibility in same network, whereby solved the problem that a paging system is not able to transfer an analog voice signal in the past.

11 Claims, 8 Drawing Sheets

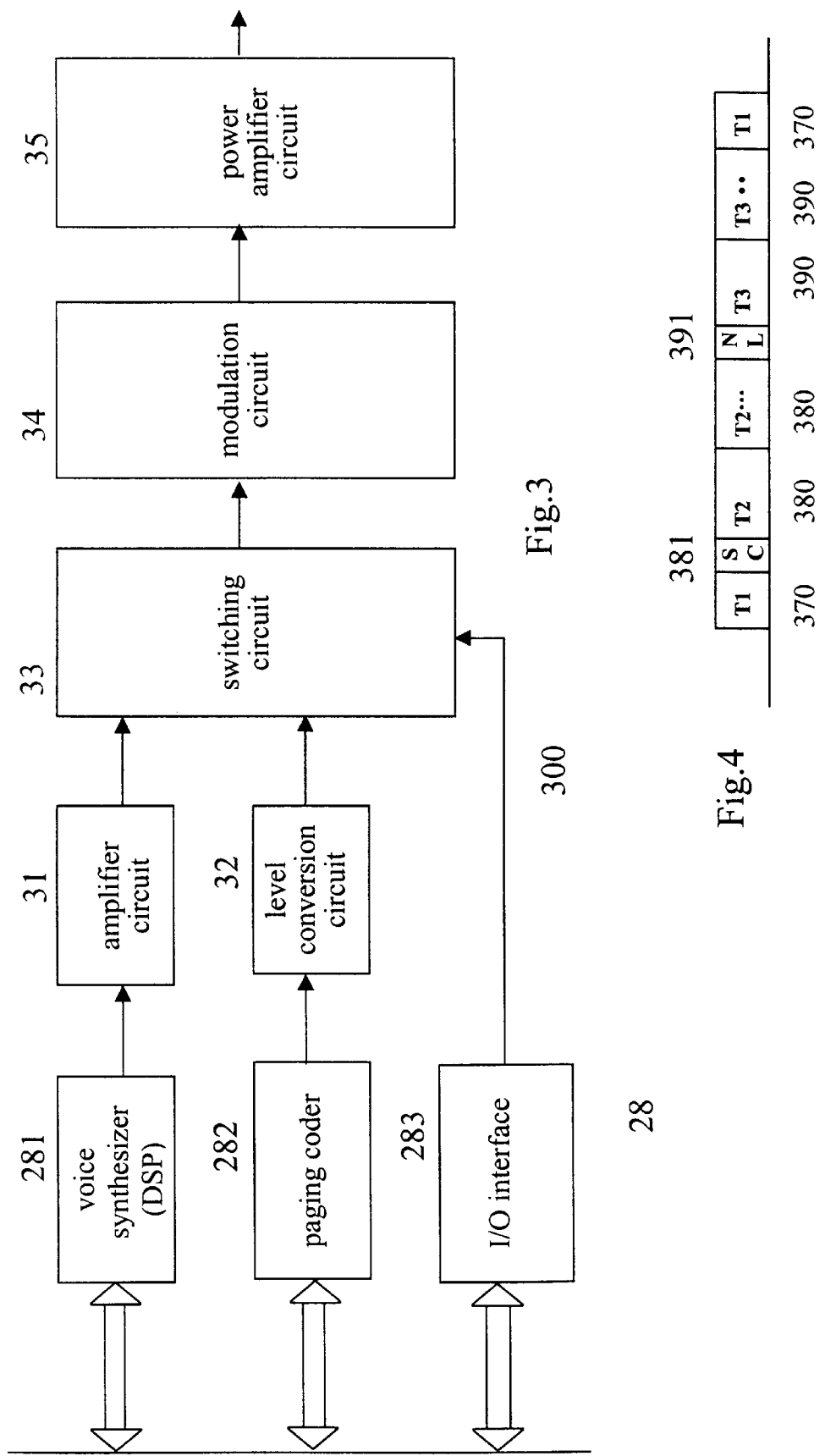

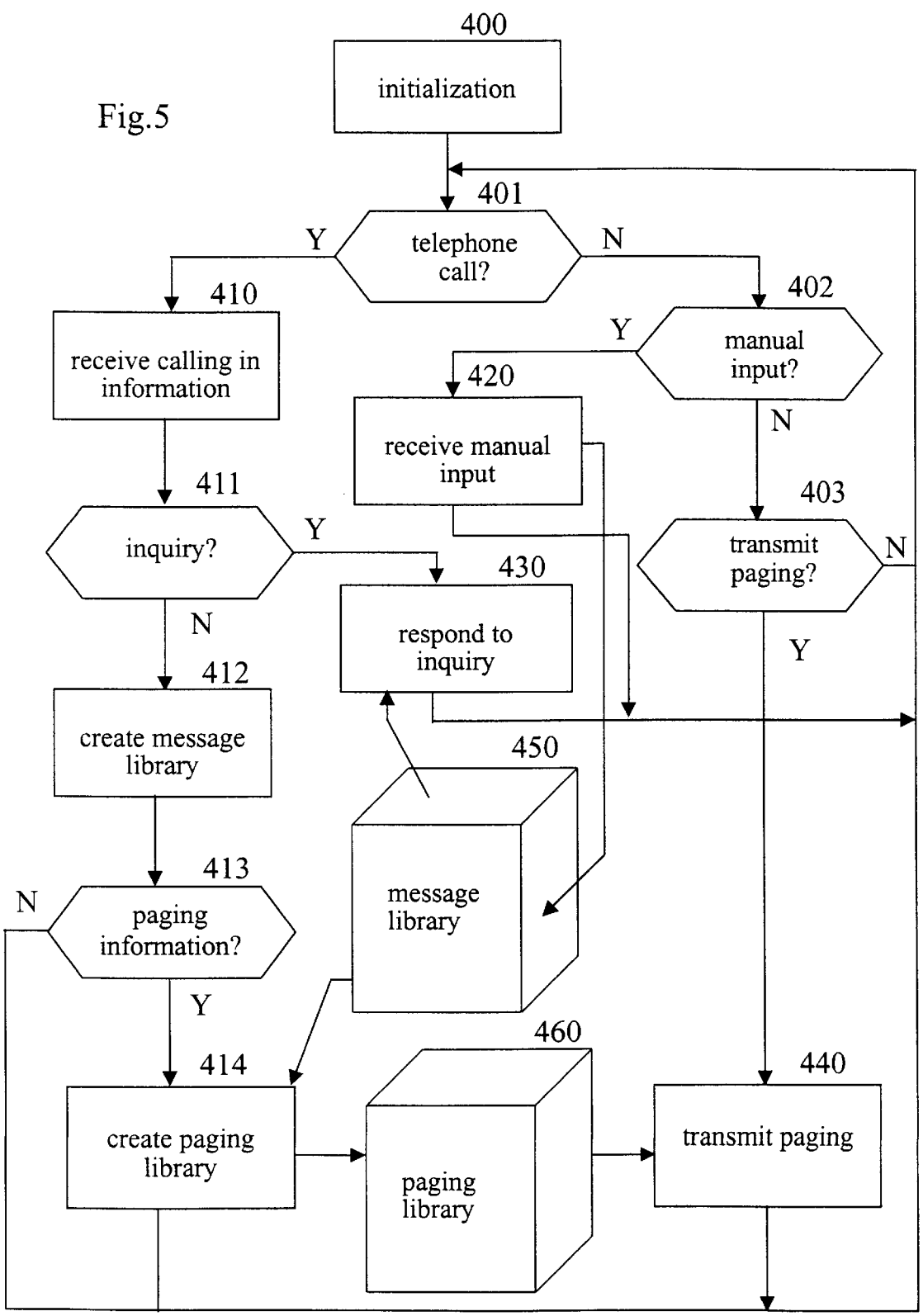

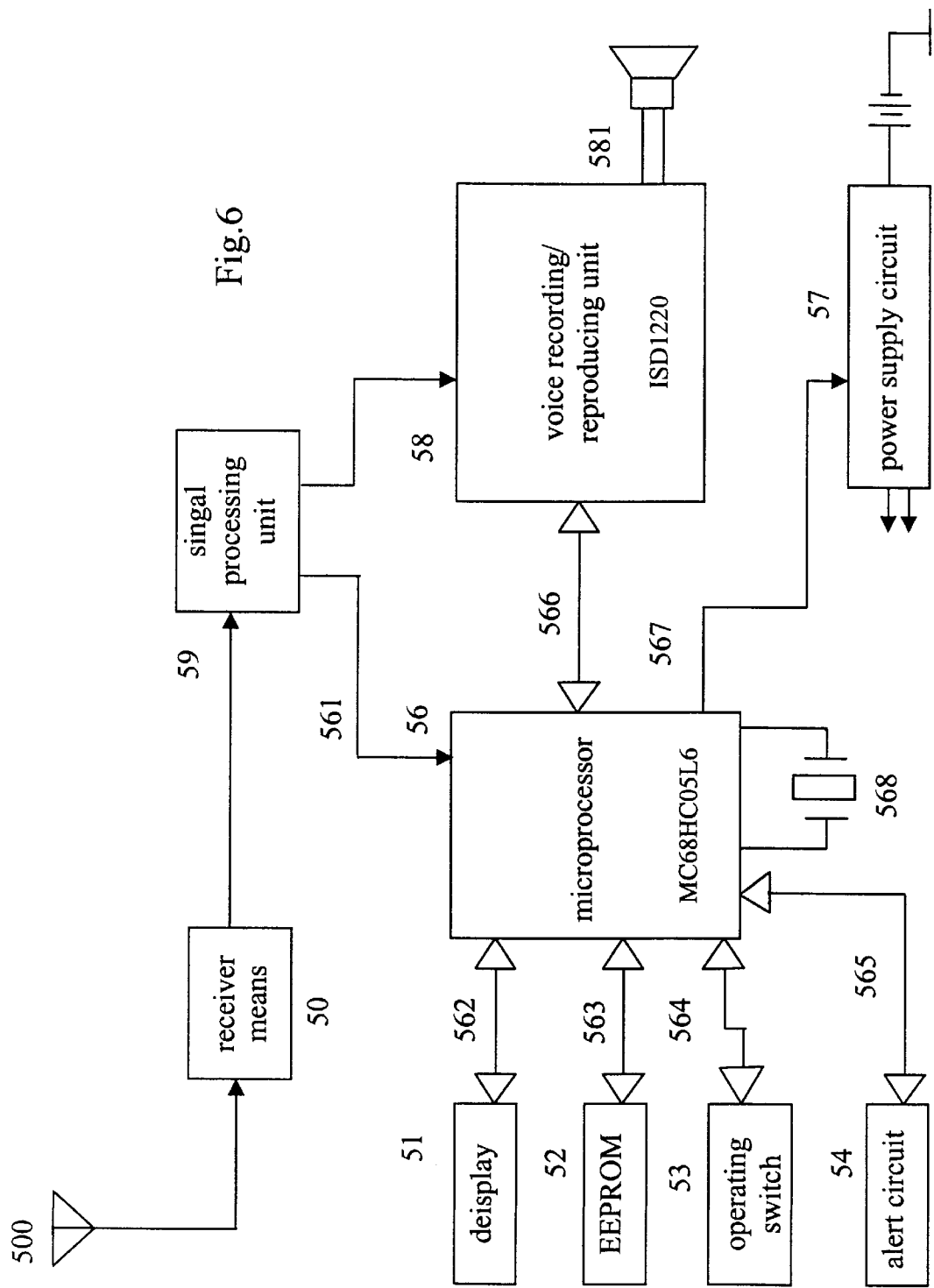

VOICE AND DIGIT COMPATIBLE FULLY AUTOMATIC RADIO PAGING SYSTEM

FIELD OF THE INVENTION

The present invention relates to a radio paging system pertaining to the field of radio communication, and particularly to a voice and digit compatible fifty automatic radio paging systems

BACKGROUND OF THE INVENTION

Known radio paging systems have evolved from merely uttering of some single sounds to communicate information into the communication of much more information by the use of digits, letters, and Chinese characters This system acquires the paging information to be transmitted by a paging center via a wire line telephone network, and then sequentially transmits the information via a radio lie after the information being encoded by a coder. A group of digital pagers each having a unique address code operate simultaneously, with each of them receives information associated with the address code thereof, and then informs the subscriber with alerting signs. The pager displays corresponding information in digital (or Chinese character) form when a user depresses the query key. Normally, the digital pager contains any memory to store the paging information received for reviewing by the user at any time.

However, there are limitations on the above mentioned digital pagers, when pagers using digits or letters in displaying are used in territories of non-alphabetic spelling languages (Chinese character), it is necessary to look up information with the help of a code book which is inconvenient to use; pagers using Chinese character display mode are only suitable to be used for certain specific language, and of a large word library and high cost, Radio paging code can only be generated from the wire line telephony information with manual operation at the radio paging center, thus it is difficult to realize automation, and these have caused difficulties in mass production ad application.

SUMMARY OF THE INVENTION

It is therefore an object of the present invention to provide a voice and digit compatible fully automatic radio paging system capable of overcoming the above-mentioned problems of the prior art paging system, wherein digit (e.g. pager code, call transfer code, telephone number, etc.) and voice information can be acquired automatically by the system over the telephone network, a radio paging information library can be generated automatically, and the voice and digital paging information can be directly transmitted to a specified voice and digit compatible pager via a transmitter. The system may transmit paging information of pure digits, pure voices or hybrid of voices and digits; the system allows relatively long voice broadcast be transmitted to voice and digit compatible pagers in broadcast mode; the voice and digit compatible pager of the present invention may receive voice and digit information transmitted by a transmitter and store the corresponding data in the pager for repeatedly listening to the voice information and viewing the digital information on the pager by the subscriber, the present system also allows for the use of conventional pure digital pagers, the central paging station may reserve the voice information in a message information library, and the user may automatically inquire the voice information by the use of a wire line telephone via the message query system, such that the voice and digit compatible pager and digital pager may operate on the same network and be compatible with each other.

The voice and digit compatible fully automatic radio paging system of the present invention comprises a central radio paging station capable of automatically capturing voice and digital paging information from a telephone network, creating paging information library, as well as automatically transmitting voice or digital signal via transmitter; and a plurality of pagers, wherein the central pager station includes a telephone line interface in connection with a telephone network, a voice and digit processing means capable of dialog with the telephone caller and automatically collecting pager number, paging code, voice information etc. and generating a paging queue, wherein the voice and digit processing means is also capable of automatic processing in response to the request of the telephone caller for creating the message information library, inquiring into the message information library and the paging information library, wherein the central paging station fiber comprises a transmitter capable of alternatively transmitting digitally encoded signal and voice signal under the control of the voice and digit processing means.

N Pagers in the voice and digit compatible fully automatic paging system of the present invention are allocated into M groups (M being an integer less than N) for addressing, each of the pagers has an ID code identifying which of the M groups it belongs to, and can keep synchronization with the transmitter by receiving and identifying the "prefix code" and "frame synchronizing code" transmitted by the transmitter, and receive its own "address code", and if the received "address code" matches its own "address code", then the digital codes following the address code are received. The digital codes are identified by the use of a specific bit different from the "address code", there is also an indicator at the end of the digital code. The "address code" includes two bits to indicate whether it is a digital paging or a voice and digit paging signal. For voice paging, digital information follows the "address code" and an idle code is added at the end of the digital information, there is voice information thereafter, then a "prefix code" indicating the end of voice information follows the voice information. The voice and digit compatible pager determines whether there is voice information after having received an "address code" that matches its own address. If there is voice information, it starts to receive the voice information after completion of receiving digital information, and recording the voice information onto corresponding storage, the end of the voice information is indicated by receiving another "prefix code", which stops recording and returns to digit receiving mode. It should be especially noted that when the paging center begins transmitting analog voice information, all pagers except the one with a matching "address code" do not receive any digit information because of no word synchronizing code being received, and turn to looking for "prefix code" state, then return to synchronizing state only when another a "prefix code" occurs at the end of the voice information; for a pager that is receiving the voice information, its digit receiving portion is also out of synchronization and enters looking for "prefix code" state, it resumes synchronization of reception of digits and at the same time stops reception of voice information when a "prefix code" is received at the end of voice information, this desirably realizes the hybrid transmission and reception of voice and digit; for digital pagers, they may operate within the same network with voice pagers. The present system creates a separate message mail box for each of the digital pagers by the creation of a "message library" in the central paging station, stores voice information in the "message library", and transmits digital paging information for those having message left, the subscriber may inquire for the message using the telephone.

Said voice and digit compatible pager comprises a signal receiving means, a signal processing unit, a microprocessor and a display, a memory, an operating switch, an alert circuit, and a power supply circuit connected to the microprocessor; and a voice recording/reproducing unit connected to said signal processing unit and microprocessor;

Said voice recording/reproducing unit synthesizes digital voice signals into analog voice signals which are outputted by a speaker connected to the output terminal thereof;

Said voice and digit compatible pager operates according to the operation flow of the voice and digit compatible pager under the control of the microprocessor.

The effects of the present invention are as follows:

Since a voice and digit processing means is provided in the central radio in paging station and a voice recording/reproducing unit is correspondingly provided in the pager according to the present invention, such that the original radio paging system has an expansion of the transmission and reception functions of analog voice signal thereby the problem that conventional radio paging system can not transmit analog voice signal is solved, thus a pager may not only display digits and Chinese characters, but also transmit various voice signals and reproduce voice signals, thereby the practicability of the radio pager has been enhanced significantly.

A disc storage is provided in the present invention to create message information library and a paging information library for input paging information such that uses are allowed to inquire for message and paging information and are urged to perform operation; thereby the paging system of the present invention answers the demand of subscriber at any time. Since a voice recording/reducing unit is provided in the pager of the present invention, voice information may be stored and played repeatedly, thus the usage of the system of this invention is much more convenient as compared with the of a playing-on-receipt system.

BRIEF DESCRIPTION OF THE DRAWINGS

FIG. 3 is a circuitry block diagram of the voice and digit coder and transmitter portion of the central radio paging station according to the present invention;

FIG. 4 is a schematic diagram showing the coding protocol employed by the present invention;

FIG. 5 is a flow chart showing the operation of the voice and digit processing means according to the present invention;

FIG. 6 is a schematic block diagram of the voice and digit compatible pager of the present invention;

PREFERRED EMBODIMENTS OF THE INVENTION

Figure 1:
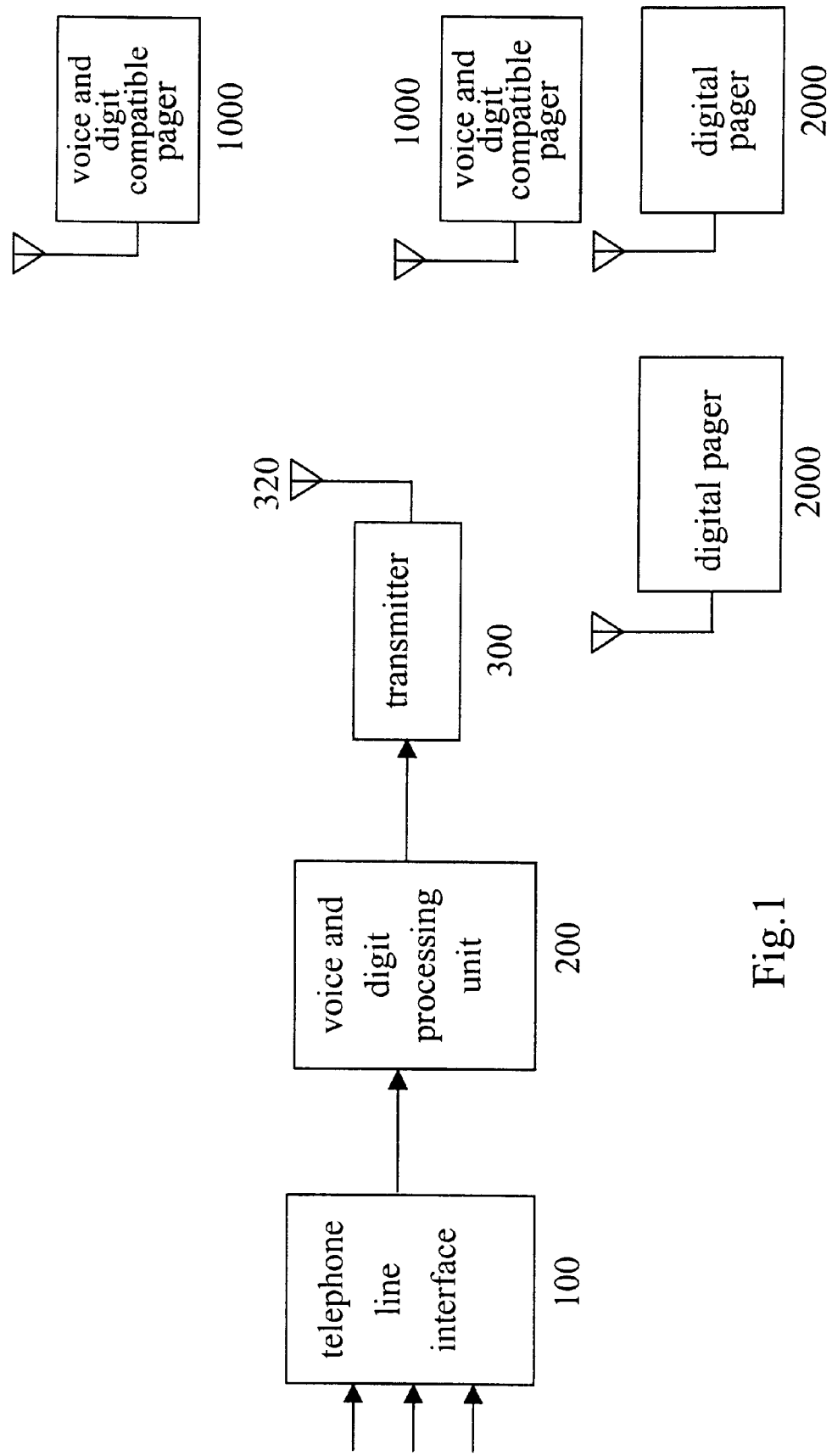
FIG. 1 is a schematic block diagram of a voice and digit compatible fully automatic radio paging system of the present invention.

The features of the present invention will be further described as follows in conjunction with the drawings and embodiments:

FIG. 1 shows a schematic block diagram of a voice and digit compatible fully automatic radio paging system of the present invention. Telephone line interface 100, voice and digit processing means 200, and transmitter 300 constitute the central paging station 1 of the present invention, a plurality of voice and digit compatible pagers 1000 constitute the voice and digital paging subscribers of the present invention, a plurality of digital pagers 2000 constitute the digital paging subscribers of the present invention, these two kinds of subscribers constitute the paging subscriber group N (N being an integer). When a telephone subscriber calls in from the telephone line interface 100, the voice and digit paging information or pure digital paging information is collected by the voice and digit processing means 200 using dialog mode, and then the paging information is transmitted to the voice and digit compatible pagers 1000 and digital pagers 2000 through the transmitter 300, the pager with a matching "address code" of the paging information receives the paging information associated with it.

Figure 2:
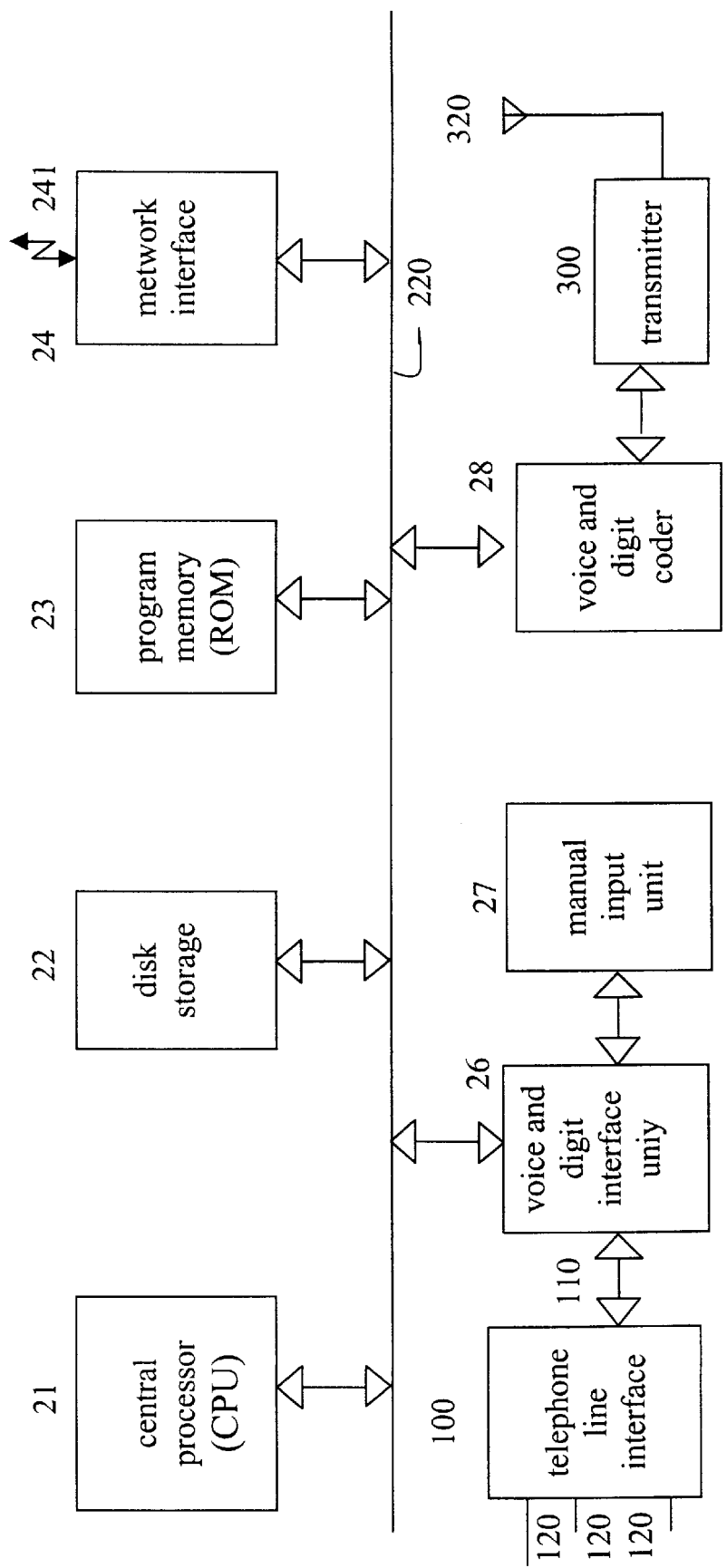
FIG. 2 is a circuitry block diagram of a central radio paging station according to the present invention.

FIG. 2 shows a circuitry block diagram of the central radio paging station 1 according to the present invention. The voice and digit processing means 200 comprises: a central processing unit 21, disc storage 22, program memory 23, voice and digit interface unit 26, manual input unit 27, voice and digit encoding unit 28; the telephone interface 100 shown in the figure converts the information admitted over the telephone line 120 into equivalent signals acceptable by the voice and digit interface unit 26, for example, converting the pulse dialing signal or DTMF dialing signal on the telephone line to equivalent digital signal, converts the call in singing signal and on-hook signal into signal signals, and sends them to the voice and digit interface unit 26 via line 110; the manual input unit 27 is, connected to the voice and digit interface unit 26 through line 271, allowing the operator to input voice and digit paging information into the computer in interactive mode; the central processing unit (CPU) 21 shown in FIG. 2 is connected with the computer bus 220, the disc storage 22 connected to the bus 220 is used for storing the paging information library, message library and system supporting software; the network interface 24 connected to the bus 220 may communicate with other central paging stations of the same type via cable 241 to form a network to expand the coverage of paging; the program memory (ROM) 23 connected to the bus 220 stores a program which controls the operations of the computer's central processing unit (CPU) 21 and all circuits connected thereto, these controls the actions of the entire system. The voice and digit interface unit 26 communicates with the telephone line interface 100 via an interface line 110 to acquire digital and voice information over the telephone line in dialog mode with the telephone subscriber, at the same time, it acquires paging information, message information, and inquiry information. The voice and digit interface unit 26 transfers digital information to the computer bus 220, and converts the voice information received to digital signal and then sends it to the bus 220, for the creation of a message information library therefrom by the computer. The computer also creates a paging information library for the paging information, and stores it on the disc storage 22. The voice and digit interface unit 26 is connected to the manual input unit 27 via line 271, the operator may input voice and dial paging information into the computer with the manual input unit 27, the operator is also allowed to issue voice broadcast information. The voice and digit encoding unit 28 connected to the bus 220 converts digital voice signals into analog voice signals, and supplies them to the transmitter 300 via the transmission line 281 for transmission thereof. Under the control of the control program stored in the program memory (ROM) 23, the central processing unit (CPU) 21 transfers the voice information and digital information stored in the disc storage 22 to the voice and digit encoding unit 28 via the bus 220, and further supplies the voice signal and digital signal from the voice and digit encoding unit 28 to the transmitter 300 via the transmission line 281, then transmits them from the antenna.

Under the control of the central processing unit 21, the voice and digit processing means 200 receives via voice and digit interface unit 26 the dialing information and voice information telephone line, converts the dialing information into ASIC code used by computers and converts the voice information into voice information of digital form and sends the latter to the message information library in the disc storage 22 via the bus.

The voice and digit processing means 200 processes in CPU 21 the message information in the disc storage 22 and transmits the same sequentially via the voice and digit encoding unit 28. The voice and digit encoding unit 28 may transmit digital paging coded signal or digitized voice signal or analog voice signal.

The voice and processing means allows a subscriber to inquire "messages" or listen to the voice paging information.

The transmitter 300 is connected to the voice and digit encoding unit 28 via the transmission line 281, such that the transmitter 300 operates synchronously in digital mode or analog voice signal mode with the voice and digit encoding unit 28. The present embodiment employs frequency modulated transmitter, and the digital signal employs frequency shift keying (FSK) mode, of course, other modulation modes can also be used selectively.

FIG. 3 illustrates a circuitry block diagram of the voice and digit encoding unit and transmitter of the central radio paging station according to the present invention, wherein the voice and digit encoding unit 28 comprises a voice synthesizer 281, paging coder 282 and a input/output (I/O) interface 283 connected with the bus 220 respectively, and further comprises an amplifier circuit 31 and a level conversion circuit 32 connected respectively with the voice synthesizer 281 and paging code 282 and a switching circuit 33 connected with amplifier circuit 31, the level conversion circuit 32 and the input/output (I/O) interface 283; the transmitter 300 is constituted by a modulation circuit 34 and power amplifier circuit 35; the switching circuit 33 is connected the modulation circuit 34.

The voice synthesizer 281 receives digitized voice signals from the bus 220 and converts them into analog voice signals, while the paging coder 282 receives digital paging information from the bus 220 and converts it into digital signals in conformity with the paging coding protocol.

Said amplifier circuit receives the analog signal output from said voice synthesizer, and stabilizes it in the range allowable by said modulation circuit, then it is switched by said switching circuit to said modulation circuit and modulated therein, thereafter, it is output to the power amplifier circuit.

The amplifier circuit 32 receives the analog signal output from said voice synthesizer 281, the level conversion circuit 32 receives the digit signal output from said paging coder 282, one of the two channels of signals output from said amplifier circuit 31 and level conversion circuit 32 is switchingly selected by the switching circuit 33 under the control of said I/O interface 283 circuit, then it is transmitted after being modulated by the modulation circuit 34 and power amplifier by the power amplifier circuit.

FIG. 4 is a schematic diagram illustrating the coding protocol of the voice and digit compatible paging information according to the present invention, and more specifically, it is a simplified timing chart of the paging code issued by the voice and digit compatible fully automatic central radio paging station of the present invention. A paging call in the present embodiment is led by a prefix code (T1) 370, followed by a number of digital information frames (T2) 380 and a number of voice information frames (T3) 390, the digital information frames 380 are led by a frame synchronization code (SC)381, while the voice information frames 390 are led by an idle code (NL) 391, followed by a number of contiguous voice information frames, a prefix code (T1) immediately following the last voice information frame identifies the termination of a voice information, the paging call may be terminated after this prefix code, otherwise if there is further paging information to be issued, the information frames of another paging call can be transmitted immediately.

The prefix code (T1) 370 in FIG. 4 consists of a binary code sequence comprising alternatively varying bits 1010 . . . 10, with a duration of 1 sec, or longer of shorter; the digital information frame 380 consists of 9 code words 381, 382, . . . , 389, or more or less code words; each of the code words consists of a binary code of 32 bits, or more of less bits; the code words are further divided into frame synchronization code words (SC), address code words, digital code words, and idle code words (NL), all the codes having a most significant bit of 1 in the code sequence consisting of 32 bits are determined as the address code words, and the codes having a most significant bit of 0 are determined as the digital code words, and two codes taken from the address code words are defined as the frame synchronization code word (SC) and the idle code word (NL), respectively (these two codes can no longer be allocated and used as address code); two bits are further selected and defined as functional bits for indicating the features of the data following this address code, for example, the 29th and 30th bits are selected (of course, other bits can be selected as well):

| 30th bit | 29th bit | data feature |
|---|---|---|
| 0 | 0 | pure digital paging |
| 0 | 1 | digit + digitized voice paging |
| 1 | 0 | digit + voice paging |
| 1 | 1 | pure voice paging |

Of course, they can be redefined according to the demand of application.

It is assumed in the present coding embodiment that the digital information frame 380 consists of 9 code words, wherein the first code word is a frame synchronization code word (SC), the remaining 8 code words are defined as for transmitting 8 address code words or for transmitting digital code words; when they are used as address code words, the second address code word 382 corresponds to a group of pagers, this group of pagers are designed to selectively receive the address code word 382 only and decode it, when the address code of the address code word 382 matches the "address code" of the local pager, the information that follows is received until another address code word or an idle code word being encountered, then the reception is stopped, similarly, the third address code word 383 corresponds to the second group of pagers accordingly, thus there are 8 groups of pagers correspond to 8 address code words 382, 383 . . . and 389, respectively; this addressing method facilitates the implementation of power saving design of pagers; the voice information frame 390 is determined to have the same time duration with the digital information frame, and the beginning of the first voice information frame is determined to be led by an idle code word (NL) followed by voice information, no frame synchronization code (SC) occurs an the following voice information frames, and a prefix code 370 immediately follows the termination of the last voice information frame; the present coding embodiment further specifies that a paging call may include several digital information frames to be transmitted to several different pagers respectively, or may include several digital information frames to be transmitted to a certain pager, and a paging call may also transmit a voice paging including several voice information frames; the present coding method has achieved the object of hybrid transmission of digital information and voice information, and can ensure that both digital and voice pagers may receive respective information correctly, with the length of information being variable. Transmission of voice information using digitized voice information is virtually digital paging. The present embodiment indicates the presence of digitized voice information by the use of the functional bits in the address code, and leads the digital information frame 380 of the digitized voice with the idle code, transmits the digitized voice information by the use of digital information frame 380 and identifies the termination of the digitized voice with a prefix code.

Assuming that a certain pager Q belongs to the 8th group, the following is a description of the reception process of the voice and digit compatible pager taking pager Q as art example. The pager Q enters the frame synchronization code (SC) and the 8th group address code reception state after having received the first prefix code, and decodes the address code received where the local address code is received, decoded and confirmed, the pager begins to receive digital information, and at the same time determines if there is voice information based on the 30th and 29th bits in the address code, (assuming that there are both digital information and voice information), after the determination of the presence of voice information, the receiver receives digital information first, and determines whether an idle code (NL) has been received, when an idle code (NL) is received, it indicates that the digital information is ended. Thereafter, the pager Q begins to receive the voice paging information and record it until a prefix code 370 is received, then stops voice reception. It can be seen that whenever the central paging station specifies that only voice paging information is transmitted to a certain group of pager, there may be a group of pure voice pagers operating in that network. Of course, the pager Q of the present embodiment is a voice and digit compatible pager.

The present invention is also capable of transmitting voice information to a pager (or pagers) for a relatively long time (exceeding the storage time for voice information of the pager), i.e., in pure voice broadcast mode. It has been mentioned in the above coding embodiment that it is assumed that when the functional code of the 30th and 29th bits of the address code word is "11", it is in the pure voice broadcast mode, then when a voice pager receives an address code word matching the local address code and having a functional code "11", the pager is controlled to play the received voice information directly to the subscriber, the reception of this pure voice broadcasting information is the same as that of the voice information, except that the action taken by the hardware of the pager is slightly different.

The operation of the N pagers (N being an integer less than or equal to the addressing capability) allocated to 8 groups and the reception in the three cases of receiving digital, hybrid of digital and voice, and pure voice information can be understood from the above description.

FIG. 5 is a flow chart showing the operation of the voice and digit processing means, which is a flow chart of the operation of the central paging station 1 of the embodiment of the present invention under the control of the program stored in the program memory (ROM) 23, FIG. 5 also describes the, operation flow of the transmission of various paging information by the above-mentioned voice and digit compatible fully automatic central radio paging station. Step 400 in FIG. 5 is the power-on reset entry point of the voice and digit processing means 200, the system parameters are initialized in step and then proceeds to step 401 to determine whether there is telephone call, if no, control proceeds to step 402 to determine whether there is manual input, if no, then control proceeds to step 403 to check whether there is paging call queuing in the paging information library, if no, control returns to step 401 and the above-mentioned process is repeated; steps 401, 402 and 403 constitute the scheduler program of the present flow chart, three tasks are arranged to operate co-ordinatively based on the situations of telephone call, manual input, and queuing in the transmission paging call information library in the system. There are two sources of paging calls, one is from the telephone network, and the other is from the operator of the central paging station, when a telephone call occurs, the call signal is sent to the computer by the telephone line interface 110 via the voice and digit interface unit 26, the program determines that there is a telephone at step 401 and branches to step 410 to collect the number dialed by the subscriber. According to the features of automatic collection of telephone call of the present invention, as au example, the telephone call dialing protocol is defined as follows:

1. The voice and digital pagers are numbered in the same sequence, the numbers are decimal 6 digit numerals. Of course they may be defined to have more or less digits depending on the size of the system;

2. The paging code may consist of decimal numerals ranging from 0 to 30 digits immediately following the pager number, of course, more or less digits can be specified, when 0 digit is dialed (i.e., no paging code is dialed), it indicates pure voice paging.

3. The termination of the paging call dialing is indicated by a "*" symbol.

4. The system provides a message box for each pager, the number of which is a numeral formed by adding one (or more) digit before the pager number.

5. The termination of the message box call dialing is indicated by a "#" symbol.

After reception of a number at step 410, control proceeds to step 411 to determine whether it is paging telephone call, if so, the flow proceeds to step 412 to store the paging code and digital code plus paging identifier into the message information library, at step 410, the system is controlled to send a voice instruction "Please leave your voice paging message, please hook up if no message." to the telephone subscriber, steps 410 and 412 control the voice and digit interface unit 26 to convert the voice information on the telephone line into digital information and to store it in the message information library 450 in the disc stoke 22. When the subscriber sends out a paging terminator (or message terminator or hooking up), then a message library is created at step 412 and control proceeds to step 413 to determine whether there is paging information in the message library, if so, control proceeds to step 414, at step 414, the paging information is fetched from the message library to generate paging information and to create a paging information library in the disc storage 22, and waiting for transmission. So far, the processing of a telephone call for creating a paging is completed, and the program flow returns to the scheduler program with its entry point at step 401; the telephone call processing flow described above includes the flow for the telephone caller to create a pure digital paging call and flow for creating hybrid digital and voice call. If a telephone call does not dial paging code after dialing the pager number, but input voice information instead, then a pure voice paging call can be created, the operation flow of which is the same as that of the creation of a hybrid voice and digit paging call, thus, the automatic collection of subscriber's paging information and the automatic extraction of paging information from the message library and creation of paging information library can be achieved, this is an indication of the difference between the message library of the present invention and the ordinary voice box.

As shown in FIG. 5, the functions of each of the circuit portions are as the following:

With the indication of the voice digit processing means, the subscriber dials first the number of a pager and then dials the paging code, then the step 410 is completed. At this the voice and digit interface unit 26 receives the number of the pager and the paging code, the central processing unit 21 determines if it an inquiry or a paging, then the step 411 is completed. If it is a paging, then the pager number and digital code together with a paging identification is stored into the message information library 450 of the disc storage 22, then the control goes to the step 412 and the central processing unit controls the voice and digit interface unit 26 to send a prompt information such as "Please leave your paging information, hook up, if no information". In the processing of steps 410 and 412, the central processing unit 21 controls the voice and digit interface unit 26 to convert the voice information on telephone line into digitized voice information and store the same into the message library 450.

By allowing the creation of a message box, the embodiment of the present invention has solved the problems that voice information exceeding time limit (e.g. 20 sec) length can not be transmitted to a voice and digit compatible pager in the form of voice paging information and that pure digital pagers can not receive voice information. The telephone call processing flow for creating message box will be described in the following with reference to FIG. 5; when there is a message box telephone call, the decision of step 401 is "yes", and the control system sends a voice message "This is central station XYZ, dial please" to the telephone subscriber at step 410, and the telephone subscriber dials the message box number and the terminator "#" according to the telephone call dialing protocol. The control system receives the number at step 410, and prompts the telephone subscriber to dial a functional code to specify the creation of a message box or making inquiry of the message box, for calls for creating message box, the control system branches to step 412, in which the control system dialogs with the telephone subscriber to create a message information library, for inquiry calls the control system dialogs with the telephone subscriber to supply the voice information inquired by the subscriber to the telephone subscriber at step 430. Certain encryption means is required in the inquiry process of message box, this is realized in step 430, After the completion of inquiry at step 430, the scheduler program is entered at step 401.

The present embodiment of the invention allows the operator to input paging information, that is, it is also accommodated to the requirements of the manual paging station. In step 402 of FIG. 5, it is repeatedly detected whether there is manual input request, if so, control proceeds to step 420, at step 420, control prompts the operator to input data of pager number, paging code and paging type etc. on the manual input unit 27, at step 420, these data are received and saved in the message library, the manual input unit allows the operator to create pure digital paging, hybrid voice and digit paging and pure voice broadcasting paging. When a pure voice paging is created, the operator inputs the pager number (one pager number, a set or a group of pager numbers may be input), then the voice broadcasting mode is selected, when this broadcasting mode paging is identified at step 420, a broadcasting indicator is added in the creation of the message library, a broadcasting indicator will be created on the adds code functional code bits when transmitting paging information at step 440, and a broadcasting mode paging is transmitted. Thereafter, the program proceeds to step 401, where it re-enters the scheduler program.

The operation flow of the transmission of paging information by the central paging station will be described with reference to FIG. 5. When the central station has created a paging information library, the program will determine at step 403 that there is paging information waiting of transmission and branch to step 440, at step 440, pure digital paging, hybrid digit and voice paging, pure voice paging or voice broadcasting paging can be transmitted based on the paging type in the paging information library. The paging information library is sorted, the number of transmissions of that paging information is recorded and the order of the paging in the queue is adjusted after the completion of the transmission of a paging at step 440, then the program returns to step 401 to enter the scheduler program. It can be seen from the above flow that from the collection of paging information, creation of message library all paging information library to the transmission of paging information, all operations are automatically performed without manual intervention, thereby automation can be achieved.

At step 440, under the control of the central processing unit 21, the control fetches from the paging information library 460 of the disc storage 22 a paging information and transfers it the voice and digit encoding unit 28, converts the digit paging information into radio paging signal for transmission and synthesizes the digitized voice information into analog voice signal for transmission.

FIG. 6 illustrates a circuitry block diagram of the voice and digit compatible pager 1000 of the present invention. In the embodiment of the present invention, a plurality of voice and digit compatible pagers 1000 operate on the same channel with the transmitter 300 of the central paging station 1 by the use of frequency modulation mode, while the digital signal employs frequency shift keying (FSK) mode, but these are not essential to the present invention, other modulation techniques can also be employed.

The voice and digit compatible pager is designed to be capable of both receiving the frequency modulated voice signal (analog signal) on certain frequency and frequency modulated digital signal; that is, capable of both receiving, storing and displaying the received digital signal, and receiving, storing and reproducing voice signal, in addition, it is also capable of receiving voice broadcasting information. Now, it will be described in detail with reference to FIG. 6 as follows: the voice and digit compatible pager comprises an antenna 500, a receiver means 50, a signal processing unit 59, a microprocessor 56, a display 51, an electrically erasable memory 52, an operating switch 53, an alert circuit 54, a power supply circuit 57 and a voice recording/reproducing unit 58; the antenna 500 has appropriate geometry and size such that the radio frequency signal transmitted by the central paging station can be received desirably; the radio receiver means 50 is a known radio signal receiver means, and the receiver means 50 of the present embodiment is a frequency modulated receiver means which output audio signal to the signal processing unit 59, the signal processing unit 59 supplies the audio signal to the voice recording/reproducing unit 58 and the digital signal to the microprocessor 56, the digital signal may be a paging digital signal or a digitized voice signal.

With the microprocessor 56 as a kernel, a decoder circuit for receiving digital signal, decoding and performing various controls is constituted. Wherein a read only memory (ROM) and a random access memory (RAM) is included, a control program which controls the performing of various operations by the voice and digit compatible pager is stored in the ROM, a further description of its operation flow will be given later; the RAM is used to store the received digital signal; the microprocessor 56 is connected to the display 51 via an I/O interface 562, and the display is used to display the operating states and the received digital paging code; the electrically erasable programmable memory (EEPROM) 32 is connected to the microprocessor 56 via an interface 563, an address code unique to and representing the voice and digit compatible pager, indication information indicating to which group of groups 1,2, . . . , M (M being 8 in this embodiment) this pager belongs, the coding of the prefix code, the coding of the frame synchronization code, the coding of the idle code, the definition of the functional code in the address code and information relating to digital communication speed, alert mode and etc. are stored in the EEPROM 52; the operating switch 53 is connected to the microprocessor 56 via an I/O interface 564, which is used to send operating instructions such as stopping alert, displaying digital information, audio reproducing, power-on, power-off, change of alerting mode and etc. to the microprocessor 56; the alert circuit 54 is connected to the microprocessor 56 via an interface 565, which outputs audio alert, light alert or vibration alert under the control of the microprocessor 56; crystal 568 determines the frequency of the operating clock of the information processing unit 59; the interface circuit 566 of the microprocessor 56 is connected to the voice recording/reproducing unit 58, and sends to the voice recording/reproducing unit 58 various control signals.

Figure 8:
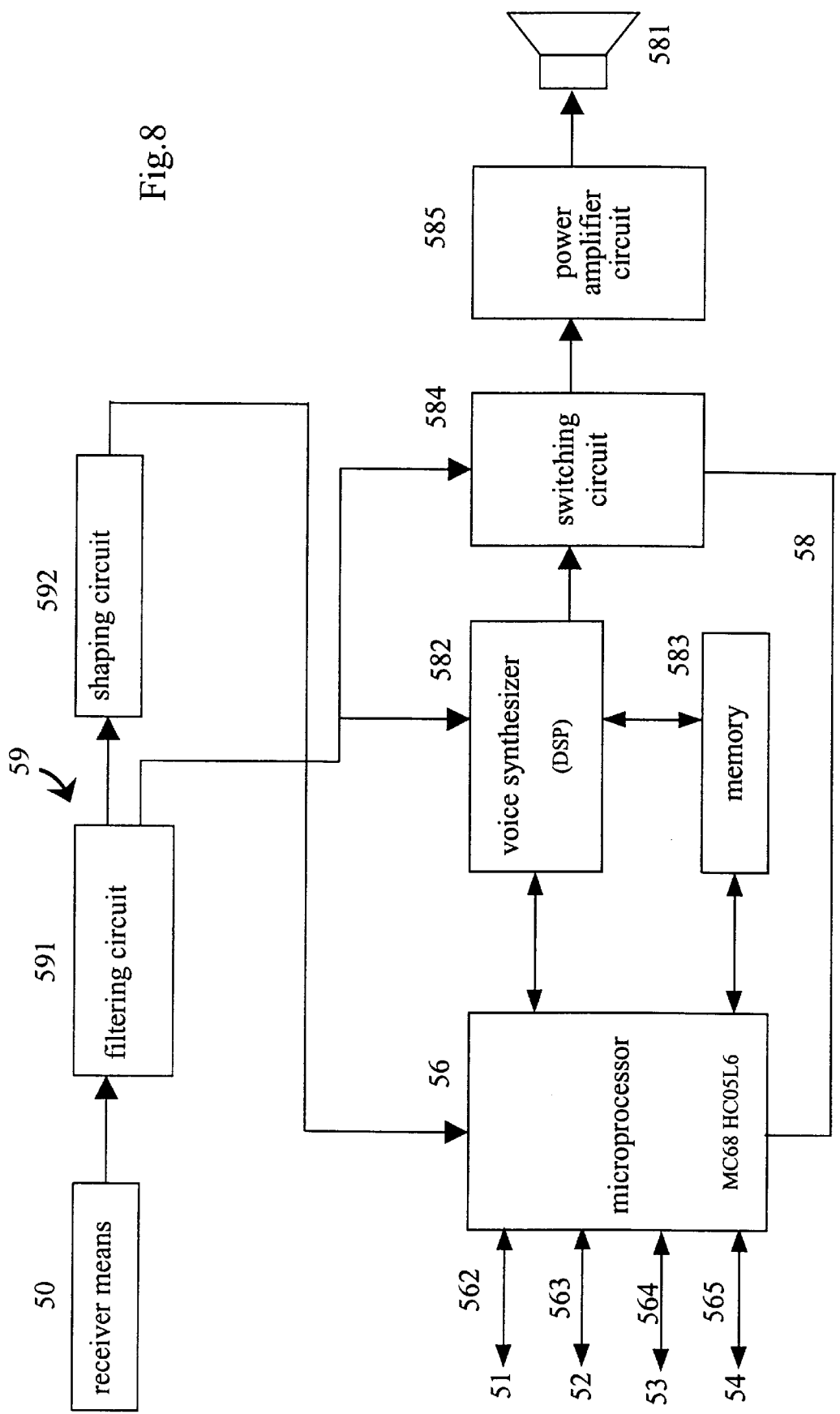
FIG. 8 is a circuitry block diagram of a voice and digit compatible pager according to an embodiment of the present invention.

As shown in FIG. 8, the voice recording/reproducing unit 58 is constituted by a voice synthesizer circuit 582, memory 583, switching circuit 584 and power amplifier circuit 585; the signal processing unit 59 is constituted by a band pass filter circuit 591 and a shaping circuit 592, which eliminates noises from the audio signal supplied from the radio receiver means 50 by filtering, and at the same time shaping and amplifying the audio signal to form square wave digital signal for outputting, the above-mentioned circuits constitute a frequency modulated receiver circuit which is capable of receiving frequency modulated voice signal and frequency modulated digital signal, the voice recording/reproducing unit 58 is capable of recording and reproducing voice signal, when analog voice signals are received, the analog signals are first converted to digitized voice signals and then stored in the memory by the voice recording/reproducing unit, and is recovered to analog signals upon reproduction; when digitized voice signals are received, the digitized voice signals are sent to the voice recording/reproducing unit 58 by the microprocessor 56, and the digitized voice signals are stored directly into the memory by the voice recording/reproducing unit 58, which are converted into analog voice signal and reproduced by the voice synthesizer 582; the speaker 561 serves to reproduce the voice. The microprocessor 56 controls the voice recording/reproducing unit 58 to record, reproduce of directly play the voice information received based on the digital signal received and the coding protocol.

Said microprocessor receives digital signals from said shaping circuit and decodes them;

One of said decoding is used for controlling said voice synthesizer to convert the analog voice signals output by the filter into digital signals and store them into the memory;

The second one of said decoding is used for controlling said switching circuit the analog signals output by said filter to the power amplifier via the switching circuit and play them by the speaker;

The third one of said decoding is to convert the digital voice paging code signals received into data of the voice synthesizer format and store them into the memory;

When the inquiry switch of said operating switches is depressed, said microprocessor transfer control signals to the voice synthesizer, the voice synthesizer fetches the last data segment stored in the memory and recovers it into voice signals which are played by the speaker via the switching circuit and the power amplifier.

Figure 9:
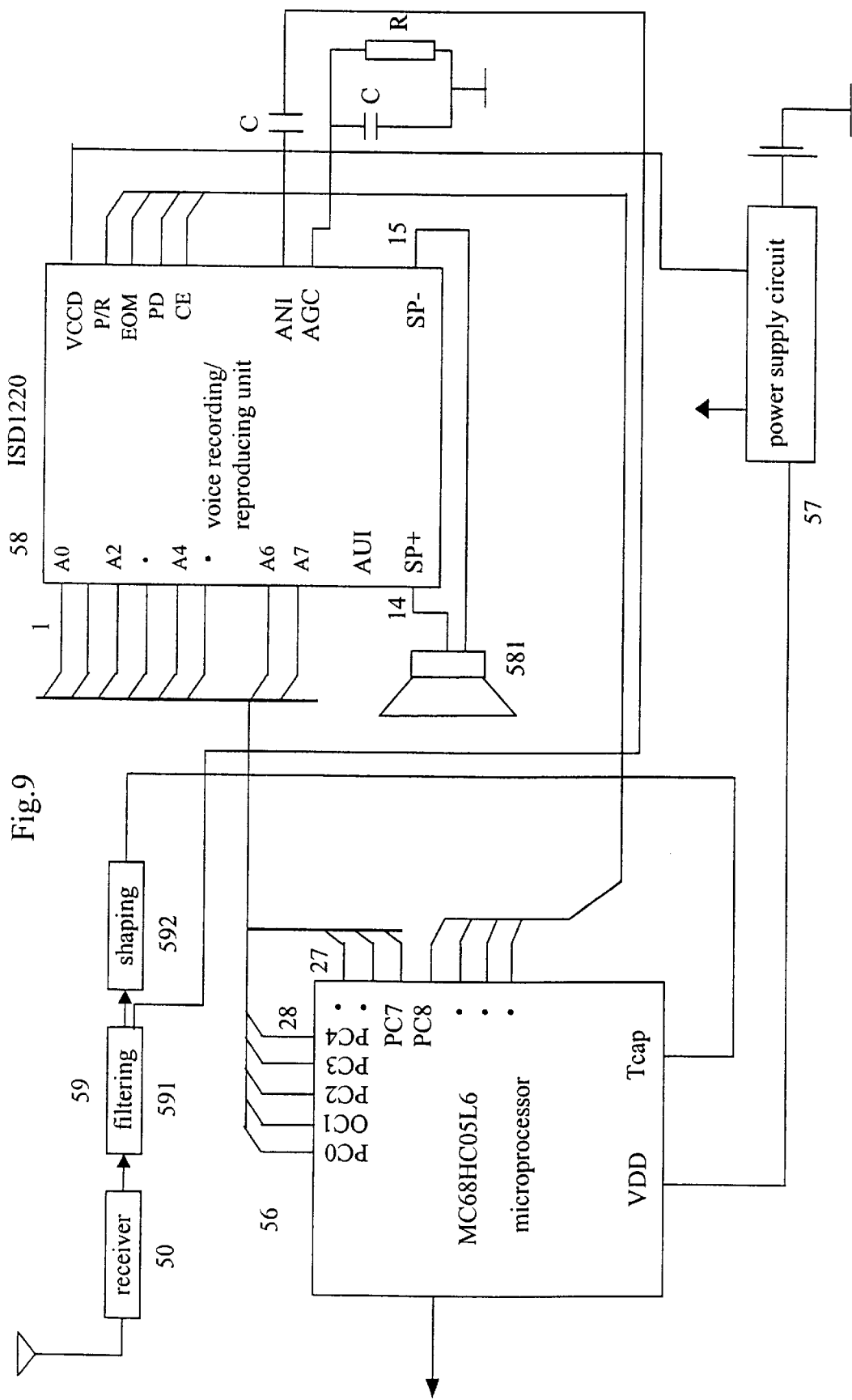
FIG. 9 is a circuitry wiring diagram of a voice and digit compatible pager according to another embodiment of the present invention.

FIG. 9 shows another embodiment of the voice recording-reproducing unit 58, which can also employ an analog voice recording/reproducing integrated circuit. The analog voice recording/reproducing integrated circuit may employs an integrated circuit of model ISD1220. The audio signal from the receiver means 50 are to the analog signal input terminal ANI and the auxiliary input terminal AUI of the analog recording/reproducing integrated circuit via the filtering by the filter circuit 591. The signal output from the filter circuit 591 becomes a square wave after being shaped by the shaping circuit 592 and is sent to the microprocessor 56 which receives the digital signal and decode the same.

One of said decoding is to control the analog voice recording/reproducing integrated circuit by the microprocessor 56 to store the analog voice signals output by the filter circuit 591 into the analog voice recording/reproducing integrated circuit;

The second one of said decoding is controlled by the microprocessor 56 to input the analog signals output the filter circuit via the auxiliary terminal AUI and plays them out directly by the speaker 581;

When the inquiry key of the operating switches 53 connected with the microprocessor 56 is pressed, the microprocessor 56 controls the analog voice recording reproducing circuit to play paragraph of the last recorded voice signals.

The power supply circuit 57 in FIG. 6 is responsible for supplying power to the pager, and has the functions of voltage boost and stabilization. The power supply circuit supplies power in co-ordination with the power saving operation of the pager under the control of the microprocessor 56 via interface 567.

The radio receiver means 50 is a known circuit means, the receiver means of the present embodiment is a frequency modulated receiver means which is constituted by an antenna amplifier circuit, a first local vibration circuit, a first mixing circuit, a second local vibration circuit, a second mixing circuit, an intermediate amplifier, a filter and a frequency discriminating circuit, it receives radio frequency signals from the antenna and outputs audio signals, it can also receive frequency shift keying (FSK) signals.

FIG. 6 shows only one embodiment of the voice and digit compatible pagers of the present invention, the voice and digit compatible pager may be constituted by the use of any receiver circuit and other similar microprocessor and voice recording/reproducing unit, and a pure voice pager may be constituted by eliminating the display on the basis of the voice and digit compatible pager shown in FIG. 6; when the voice digitization technique has achieved the object that the amount of information after voice digitization becomes less than 1200 BPS, then the voice information can be transmitted directly in digital signal mode, and the pager shown in FIG. 6 may receive digital voice information from the microprocessor 56 and send it to the voice recording/reproducing unit 58 through the interface 566, and then recording onto the memory, that is, the present invention also allows for transmitting voice information using digital coding mode, these are the recombination of the functional modules in the present embodiment of the invention, and are within the scope of the present invention.

Figure 7:
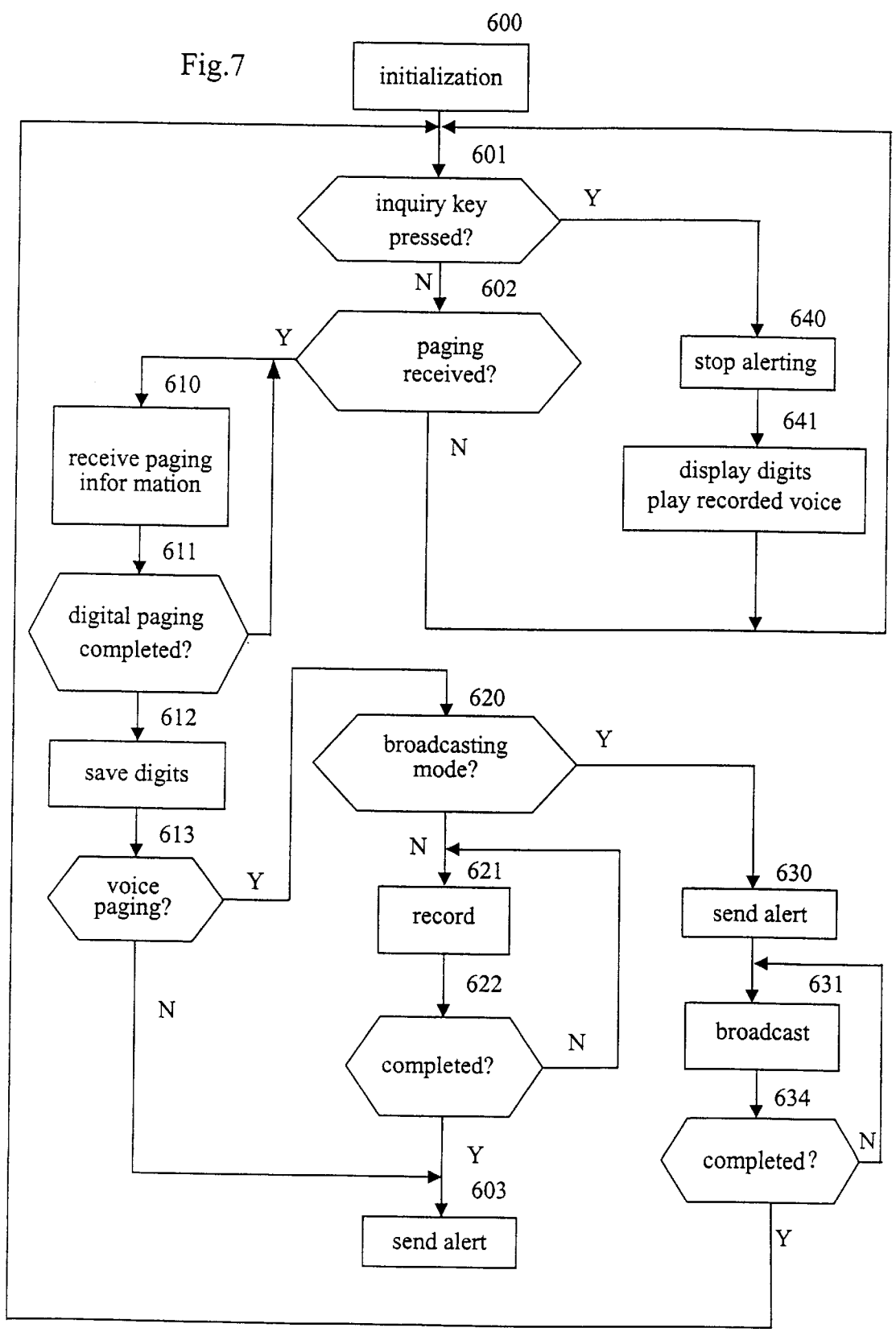
FIG. 7 is a flow chart showing the operation of the voice and digit compatible pager according to the present invention.

FIG. 7 illustrates the operation flow-chart of the (ROM) control program of the microprocessor 56 in the voice and digit compatible pager. Step 600 is a power-on reset and initialization program which sets each of the variable to the initial state, reads the information such as the address code, the group to which this pager belongs, and etc. in the EEPROM into the random access memory (RAM), and issues specific alert to the subscriber indicating that the pager has entered the operating state; it is determined in step 601 whether the inquiry key is depressed, if it is depressed, the program branches to step 640, it stops alerting if the pager is in the alert state and proceeds to step 641, wherein in response to the information of the pager, the most recent digital information is sent to the display for displaying, and the most recently received voice information is played, thereafter, the program branches to step 601 and enters the main scheduler program. When it is determined in step 6010 that no inquiry key is depressed, then the program proceeds to step 602 to receive the prefix code and frame synchronization code, as well as the address code, then determines whether the address code matches the address of the pager, if so, the program branches to step 610, and receives the paging information in step 610, upon the completion of reception of the digital paging information, the program proceeds to step 612, in which the digital paging information is stored into the memory. Realizing synchronization using the fame synchronization code, receiving binary digital signal and timing technique are well known and their description is omitted. Thereafter, the program proceeds to step 613 to determine whether there is voice paging information based on the functional bits in the address code, if not, the program branches to step 603 to issue an alert signal; at this point the reception of a pure digital paging is completed, if there is voice paging information, then the program branches to step 620, and determines whether it is in the broadcasting mode based on the functional bits in the address code, if so, the program branches to step 630 to control the information processing unit to sent out a specific alert signal first, then proceeds to step 631 to control the directly playing of the received voice information through the speaker, and when it is determined in step 632 that the broadcasting has been completed, the program re-enters step 601 of the main scheduler program; at this point, the reception of a broadcasting paging information is completed; if it is determined in step 620 that the functional bits of the address code indicate voice paging instead of broadcasting mode, then the program branches to step 621 to control the microprocessor 56 to issue recording control signal to the voice recording/reproducing unit 58 for starting recording; when it is detected in step 622 that the voice is terminated, the recording is stopped and the program branches to step 603 to send out an alert signal, then the program returns to step 601 of the main scheduler program; so far, the program has completed the reception of a voice and digit compatible paging information. There is no digital information following the address code of a pure voice paging information, the voice information follows immediately an idle code, the information structure of which is constituted by hybrid voice and digits; except that there are only the address code and idle code in the digital information, therefore, the reception of which is the same as that of the hybrid voice and digit paging information.

As shown in FIG. 7, the operation flow of the ROM program in the voice and digit compatible pager includes the reception procedures of pure digital, hybrid voice and digit, pure voice and voice broadcasting paging signals. As for the reception procedures of the prefix code and frame synchronization code and the power saving control, they are well known techniques and thus omitted the description thereof herein.

What is claimed is:

1. A voice and digit compatible fully automatic radio paging system capable of transmitting both voice and digit code signals within a single paging call, said system comprising a central radio paging station and a plurality of pagers, wherein said central radio paging station comprises a telephone line interface through which the central radio paging station is connected to a telephone line, a voice and digit processing means connected with the output of the telephone line interface, and a transmitter connected with the voice and digit processing means, said voice and digit processing means including a central processor, a disc storage, a program memory, a voice and digit interface unit, a voice and digit encoding unit connected to a bus, and the input of said transmitter being connected with the voice and digit encoding unit; and said pagers include voice and digit compatible pagers capable of receiving voice and digit code signal, pure digit code signals and pure voice code signals, and capable of storing voice and digit information, pure digit pagers capable of receiving only pure digit code signal, and pure voice pagers capable of receiving only pure voice code signals; wherein the voice and digit interface unit is connected to said telephone line interface, for, under the control of the central processor, reading from said disc storage a voice prompt signal, sending the voice prompt signal to the telephone line, then receiving digital code and analog voice signals issued from a telephone, converting the received digital code to computer inner code, converting the received analog voice signal into a corresponding digitized signals and storing the converted code and digitized signals in the disc storage; said central processor hybridly encodes the converted code and digitized voice signals to produce a digital paging signal, to establish a paging information queue and storing the same in the disc storage; said voice and digit encoding unit converts the digital paging signal produced by the central processor into a radio paging code signal and transmits the radio paging code signal via the transmitter under the control of the central processor, and wherein the paging signal output from said voice and digit processing means is constituted by a prefix code T1, digital information frames T2 led by a frame synchronization code, and analog information frames T3 led by an idle code, the length of the analog information frames T3 being variable; the order of the paging signal is: T1, T2, - - - T3, - - - T1, the analog information frames being followed by another prefix code T1 indicating the end of the analog information frame; and the length of the analog frame T3 may be zero, the address code of said digital information frame T2 including functional bits indicating whether it is followed by analog information frame and the type of the paging information.

2. The voice and digit compatible fully automatic radio paging system according to claim 1, wherein said voice and digit encoding unit converts said encoded digitized voice signals in said digital paging signal produced by said central processor into an analog voice signal when it converts the digital paging signal into a radio paging code signal.

3. The voice and digit compatible fully automatic radio paging system according to claim 2, wherein said disc storage is connected with the bus, and the information received by said voice and digit interface unit and a paging information library established with the paging type information are stored therein and are then transmitted via said voice and digit processing means and the transmitter under the control of said central processor; and wherein, for information of message type, said voice and digit processing means transmits a digital paging indicating that there is a message to inform a subscriber and allow the subscriber inquiring the message via a telephone; and for inquiry information, said voice and digital processing means searches the relative information from the disc storage and output the same via said voice and digit interface unit and said telephone line interface to the subscriber in response to an inquiry request of the subscriber.

4. The voice and digit compatible fully automatic radio paging system according to claim 2, wherein said voice and digit encoding unit comprises an input/output interface, a voice synthesizer, a paging coder, an amplifier circuit, a level conversion circuit and a switching circuit connected to the bus, said paging coder converting the digital paging signal into a radio paging code signal and sending it to a modulating circuit via said level conversion circuit and said switching circuit under the control of the central processor, said voice synthesizer converting the digital voice signal into an analog voice signal and sending it to said modulating circuit via said amplifier circuit and said switching circuit under the control of the central processor, and wherein the input of said input/output interface is connected to the bus and its output is connected with the control signal terminal of said switching circuit to control the selection of the analog signal and the digital signal and send the selected one to the modulating circuit.

5. The voice and digit compatible fully automatic radio paging system according to claim 2, wherein said voice and digit compatible pager comprises a receiver, a signal processing unit, a microprocessor, a voice recording/reproducing unit and a display, a memory, an operating switch, an alert circuit and a power supply circuit connected to the microprocessor; the output terminal of said receiver means is connected to the signal processing unit, the signal processing unit outputting a digital signal to the microprocessor and an analog signal to the input terminal of the voice recording/reproducing unit, the control terminal of the voice recording/reproducing unit being connected with the microprocessor and its output terminal connected to a speaker; said voice and digit compatible pager operating according to an operation flow of the voice and digit compatible pager under the control of the microprocessor; and wherein said voice and digit compatible pager receives the paging digital signal matching its own address code and stores the same in said memory and meanwhile decodes functional bits of the address code to determine whether there are analog information frames; if yes, then it begins to receive and store an analog voice signal after receiving the analog information frame leading code, and begins to receive the analog information frame ending indicator and stops receiving the analog information and issues an alerting signal to the subscriber after receiving the analog information frame ending indicator.

6. The voice and digit compatible fully automatic radio paging system according to claim 2, wherein said signal processing unit includes a filter circuit and a shaping circuit; the analog signal output from the filter circuit is input to said voice recording/reproducing unit; and the digital signal output from said shaping circuit is fed to said microprocessor.

7. The voice and digit compatible fully automatic radio paging system according to claim 5, wherein said voice recording/reproducing unit includes a voice synthesizer and a memory connected with said microprocessor, a switching circuit connected with the voice synthesizer, a power amplifier circuit connected with said switching circuit and to said speaker; the output terminal of said filter circuit is connected respectively with the signal input terminal of said voice synthesizer and the input terminal of said switching circuit; and wherein when said voice and digit compatible pager receives analog voice paging, said microprocessor decodes the functional bits of the address code and controls said voice synthesizer to convert the analog signal into digital signal and store it in said memory; when said voice and digit compatible pager receives a digital voice paging, said microprocessor decodes the functional bits of the addressing code and stores the digital voice signal in said memory; when the inquiry switch of said operating switches of said voice and digit compatible pager is depressed, said microprocessor controls said voice synthesizer to read data from the memory and synthesize the data into an analog voice signal and output it via the switching circuit and power amplifier circuit; and when said voice and digit compatible pager receives a voice broadcast, said microprocessor decodes the functional bits of the address code and controls said switching circuit to let the received voice broadcast signal be output via said switching circuit and said power amplifier circuit such that the radio broadcast signal can be received by the voice and digit compatible pager.

8. The voice and digit compatible fully automatic radio paging system according to claim 5, wherein said voice recording/reproducing unit is an analog voice recording/reproducing integrated circuit, the signal input terminal and the auxiliary input terminal of which is connected to the output terminal of said filter circuit, the audio signal output terminal of which is connected to said speaker, and the control signal line of which is connected with said microprocessor; and wherein when said voice and digit compatible pager receives an analog voice paging, said microprocessor decodes functional bits of the address code and controls to store the received analog voice signal in said analog voice recording/reproducing integrated circuit; when the inquiry switch of said operating switches of said voice and digit compatible pager is depressed, said microprocessor controls said analog voice recording/reproducing integrated circuit to output the voice information store therein at its audio signal output terminal; when said voice and digit compatible pager receives a voice broadcast signal, said microprocessor decodes the functional bits of the address code, issues an alert signal and controls said analog voice recording/reproducing integrated circuit to output the analog voice signal at its auxiliary input terminal from its output terminal such that said voice and digit compatible pager can receive the voice broadcast signal.

9. The voice and digit compatible fully automatic radio paging system according to claim 2, wherein said voice and digit processing means is a processor capable of transmitting voice broadcast signal via the transmitter and said voice and digit compatible pager is a pager capable of receiving the voice broadcast signal.

10. The voice and digit compatible fully automatic radio paging system according to claim 7, wherein said voice and digit processing means is a processor capable of transmitting voice broadcast signal via the transmitter and said voice and digit compatible pager is a pager capable of receiving the voice broadcast signal.

11. The voice and digit compatible fully automatic radio paging system according to claim 8, wherein said voice and digit processing means is a processor capable of transmitting voice broadcast signal via the transmitter and said voice and digit compatible pager is a pager capable of receiving the voice broadcast signal.

* * * * *